US010929209B2

(12) United States Patent
Chitnis et al.

(10) Patent No.: US 10,929,209 B2
(45) Date of Patent: Feb. 23, 2021

(54) SAFE, SECURE, VIRTUALIZED, DOMAIN SPECIFIC HARDWARE ACCELERATOR

(71) Applicant: TEXAS INSTRUMENTS INCORPORATED, Dallas, TX (US)

(72) Inventors: Kedar Satish Chitnis, Bengaluru (IN); Charles Lance Fuoco, Allen, TX (US); Sriramakrishnan Govindarajan, Bengaluru (IN); Mihir Narendra Mody, Bengaluru (IN); William A. Mills, Clarksburg, MD (US); Gregory Raymond Shurtz, Houston, TX (US); Amritpal Singh Mundra, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/377,404

(22) Filed: Apr. 8, 2019

(65) Prior Publication Data
US 2020/0210256 A1 Jul. 2, 2020

Related U.S. Application Data

(60) Provisional application No. 62/786,616, filed on Dec. 31, 2018.

(51) Int. Cl.
*G06F 9/54* (2006.01)
*G06F 9/50* (2006.01)
*G06F 9/38* (2018.01)
*G06F 9/455* (2018.01)
*G06F 9/48* (2006.01)

(52) U.S. Cl.
CPC ............ *G06F 9/546* (2013.01); *G06F 9/3836* (2013.01); *G06F 9/45558* (2013.01); *G06F 9/4806* (2013.01); *G06F 9/5027* (2013.01); *G06F 2009/45583* (2013.01); *G06F 2009/45587* (2013.01)

(58) Field of Classification Search
CPC ...................................................... G06F 9/546
USPC .................................................... 719/313, 314
See application file for complete search history.

(56) References Cited

U.S. PATENT DOCUMENTS

| | | | |
|---|---|---|---|
| 10,191,759 B2* | 1/2019 | Cowperthwaite | G06F 9/45558 |
| 10,275,247 B2* | 4/2019 | Mishra | G06F 9/30036 |
| 2018/0144435 A1* | 5/2018 | Chen | G06T 1/20 |

* cited by examiner

*Primary Examiner* — Andy Ho
(74) *Attorney, Agent, or Firm* — Michelle F. Murray; Charles A. Brill; Frank D. Cimino (57) ABSTRACT

This disclosure relates to various implementations an embedded computing system. The embedded computing system comprises a hardware accelerator (HWA) thread user and a second HWA thread user that creates and sends out message requests. The HWA thread user and the second HWA thread user is communication with a microcontroller (MCU) subsystem. The embedded computing system also comprises a first inter-processor communication (IPC) interface between the HWA thread user and the MCU subsystem and a second IPC interface between the second HWA thread user and the MCU subsystem, where the first IPC interface is isolated from the second IPC interface. The MCU subsystem is also in communication with a first domain specific HWA and a second domain specific HWA.

24 Claims, 6 Drawing Sheets

SAFE, SECURE, VIRTUALIZED, DOMAIN SPECIFIC HARDWARE ACCELERATOR

CROSS-REFERENCE TO RELATED APPLICATION

This application claims priority to U.S. Provisional Application No. 62/786,616, filed Dec. 31, 2018, which is hereby incorporated herein by reference in its entirety.

BACKGROUND

Today's embedded computing systems are often found in a variety of applications, such as consumer, medical, and automotive products. Design engineers generally create embedded computing systems to perform specific tasks, rather than acting as a general-purpose computing system. For instance, some embedded computing systems need to meet certain real-time performance constraints because of safety and/or usability requirements. To achieve the real-time performance, embedded computing systems often include a microprocessor that loads and executes software to perform a variety of functions and specialized hardware that improve computational operations for certain tasks. One example of specialized hardware found in embedded systems is a hardware accelerator (HWA) that increases an embedded computing system's security and performance.

As today's products increasingly continue to utilize embedded computing devices, design engineers constantly aim to improve the safety, security, and performance of these devices. For example, like any other computing system, embedded computing systems are susceptible to malware or other malicious security threats. Security intrusions may be problematic for embedded computing systems employed in applications that directly impact or are critical to safety and security applications. As an example, embedded computing systems found in advanced driver assistance systems are designed to reduce human operation error and road fatalities with motorized vehicles. Having a malicious computer program intentionally gain access to and disrupt the advanced driver assistance system could create system failures that potentially cause life-threatening or hazardous situations.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one implementation, a non-transitory program storage device comprising instructions stored thereon to cause one or more processors to create a trusted and sandboxed communication interface to facilitate communication between a designated HWA thread user and a multi-HWA function controller, where the multi-HWA function controller is configured to provide message requests from the HWA thread user to a destination, domain specific HWA. The one or more processors may filter out a first message request received from a second HWA thread user for the destination, domain specific HWA and write a second message request and privileged credential information received from the designated HWA into a buffer of the trusted and sandboxed communication interface. The one or more processors provide the second message request and the privileged credential information from the buffer of the trusted and sandboxed communication interface to the multi-HWA function controller.

In another implementation, a system comprising: a HWA thread user, a microcontroller unit (MCU) subsystem in communication with the HWA thread user and a domain specific HWA in communication with the MCU subsystem, wherein the domain specific HWA comprises a HWA thread. The MCU subsystem is configured to: receive a message request and privileged credential information from the HWA thread user, assign the HWA thread of the domain specific HWA to execute the message request, sort the message request into one of a plurality of classes based on whether the domain specific HWA is able to verify the privileged credential information and forward the privileged credential information to the HWA thread based on a determination that the message request belongs into a first class indicating the HWA thread is capable of processing privileged credential information.

In yet another implementation, a system that comprises a HWA thread user and a second HWA thread user that creates and sends out message requests. The HWA thread user and the second HWA thread user is communication with a MCU subsystem. The embedded computing system also comprises a first inter-processor communication (IPC) interface between the HWA thread user and the MCU subsystem and a second IPC interface between the second HWA thread user and the MCU subsystem, where the first IPC interface is isolated from the second IPC interface. The MCU subsystem is also in communication with a first domain specific HWA and a second domain specific HWA.

BRIEF DESCRIPTION OF THE DRAWINGS

For a detailed description of various examples, reference will now be made to the accompanying drawings in which.

While certain implementations will be described in connection with the illustrative implementations shown herein, the invention is not limited to those implementations. On the contrary, all alternatives, modifications, and equivalents are included within the spirit and scope of the invention as defined by the claims. In the drawing figures, which are not to scale, the same reference numerals are used throughout the description and in the drawing figures for components and elements having the same structure, and primed reference numerals are used for components and elements having a similar function and construction to those components and elements having the same unprimed reference numerals.

DETAILED DESCRIPTION

Various example implementations are disclosed herein that improve the safety, security, and virtualization of domain specific hardware accelerators (HWAs) within an embedded computing system. In one or more implementations, an embedded computing system includes a multi-HWA function controller that facilitates communication between one or more HWA thread users and one or more domain specific HWAs (e.g., a vision HWA). The embedded computing system creates a trusted and sandboxed communication interface that independently transfers a message request from a HWA thread user to the multi-HWA function controller. A "trusted" communication interface is one in which the source device of a communication message is confirmed to be permitted to send the message over that particular communication interface (only a predefined source device is permitted to send a message over a given communication interface. Sandboxing refers to the embedded computing system isolating each communication interface from one another. By doing so, security and/or system failures that affect one HWA thread user (e.g., a host CPU) does not affect another HWA thread user (e.g., a digital signal processor (DSP)). A trusted and sandboxed communication interface also transfers privileged credential information for each message request to the multi-HWA function controller to prevent security intrusions, such as spoofing.

After obtaining the message request, the multi-HWA function controller schedules and assigns a hardware thread for the message request to execute on a destination, domain specific HWA. As part of the scheduling operation, the multi-HWA function controller performs intelligent scheduling operations that classify message requests into classes according to the capability of the destination, domain specific HWAs (referred to as hardware assist classes). By way of example, if a destination, domain specific HWA includes a privilege generator, the multi-HWA function controller categorizes message requests for the destination domain specific HWA into a class representative of domain specific HWAs with privileged credential information checking capabilities. For destination, domain specific HWAs that do not have a privilege generator, the multi-HWA function controller may classify associated message requests into a different class indicating that other hardware components (e.g., an input/output (IO) memory management unit (MMU)) will assist with checking privileged credential information. In some situations, the multi-HWA function controller may classify message requests into another class when the embedded computing system is unable to check associated privileged credential information. In one or more implementations, the multi-HWA function controller is also able to convert between different address space sizes (e.g., from 64-bit address space to 32-bit address space) to also accommodate domain specific HWAs with varying capabilities (e.g., legacy, domain specific HWAs).

As used herein, the term "programmable accelerator" refers to a customized hardware device that is programmable to perform specific operations (e.g., processes, calculations, functions, or tasks). Programmable accelerators differ from general-purpose processors (e.g., a central processing unit (CPU)) that are built to perform general compute operations.

Generally, programmable accelerators perform designated operations faster than software running on a standard or general-purpose processor. Examples of programmable accelerators specialized to perform specific operations include graphics processing units (GPUs), digital signal processors (DSPs), vector processors, floating-point processing units (FPUs), application-specific integrated circuits (ASICs), embedded processors (e.g., universal serial bus (USB) controllers) and domain specific HWAs.

For purposes of this disclosure, the term "domain specific HWA" refers to a specific type of programmable accelerator with custom hardware units and pipelines designed to perform tasks that fall within a certain domain. The domain specific HWA provides relatively less computational flexibility than other types of programmable accelerators, such as GPUs, DSPs, and vector processors, but greater efficiency in terms of power and performance efficiency when performing tasks that belong to a specific domain. A domain specific HWA contains one or more HWA threads, where each HWA thread represents a hardware thread that receives and executes one or more tasks associated with a given domain. As hardware threads, HWA threads differ from software threads that software applications generate when running on an operating system (OS). The domain specific HWA may execute the HWA thread in a serial and/or parallel manner. Examples of domains include an imaging domain, video domain, vision domain, radar domain, deep learning domain, and display domain. Examples of domain specific HWAs include visual preprocessing accelerators (VPACs), digital media preprocessing accelerators (DMPACs), video processing engines (VPEs), and image and video accelerators (IVAs) (e.g., video encoder and decoder).

Illustrative Hardware and Use Case

Figure 1:
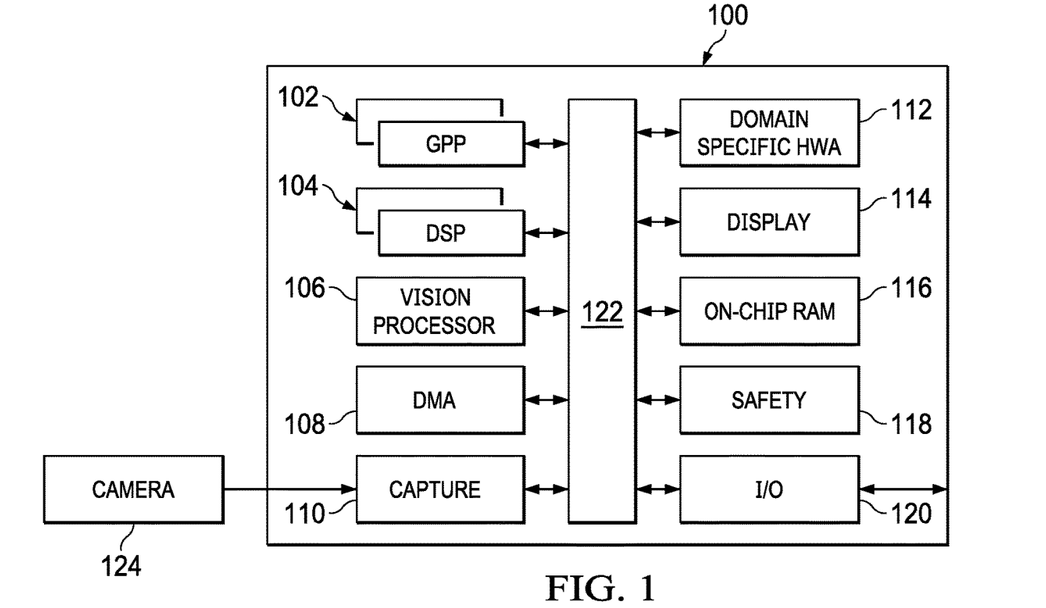
FIG. 1 is a block diagram of an embedded computing system in accordance with various implementations.

FIG. 1 is a simplified block diagram of an embedded computing system 100 in accordance with various implementations. Using FIG. 1 as an example, embedded computing system 100 is a multiprocessor system-on-a-chip (SOC) designed to support computer vision processing in a camera-based, advanced driver assistance system. The embedded computing system 100 includes a general-purpose processor (GPP) 102, a digital signal processor (DSP) 104, a vision processor 106, and a domain specific HWA 112 coupled via a high-speed interconnect 122. The GPP 102 hosts a high-level operating system (HLOS) that provides control operations for one or more software applications running on embedded computing system 100. For example, a HLOS controls scheduling of a variety of tasks that software applications generate when running on the embedded computing system 100. The DSP 104 provides support for real-time computer vision processing, such as object detection and classification. Although FIG. 1 illustrates that embedded computing system 100 includes a single GPP 102 and a single DSP 104, other embodiments of the embedded computing system 100 could have multiple GPPs 102 and/or multiple DSPs 104 coupled to one or more domain specific HWA 112 and one or more vision processor 106.

In one or more implementations, the domain specific HWA 112 is a VPAC that communicates with vision processor 106. The VPAC includes one or more HWA threads configured to perform various vision pre-processing operations on incoming camera images and/or image sensor information. As an example, the VPAC includes four HWA threads, an embedded hardware thread scheduler, and embedded shared memory, all of which communicate with each other when performing vision domain tasks. Each HWA thread is set up to perform specific vision domain tasks, for example, a lens distortion correction operation, an image scaling operation, a noise filter operation, and/or other vision specific image processing operation. Blocks of storage area in the shared memory act as buffers to store blocks of data that HWA thread processes. In FIG. 1, the vision processor 106 is a vector processor custom tuned for computer vision processing, such as gradient computation, orientation binning, histogram normalization by utilizing the output of the VPAC.

The embedded computing system 100 further includes a direct memory access (DMA) component 108, a camera capture component 110 coupled to a camera 124, a display management component 114, on-chip random access memory (RAM) 116, for example, a non-transitory computer readable medium, and various input/output (I/O) peripherals 120 all coupled to the processors and the domain specific HWA 112 via the interconnect 122. RAM 116 may store some or all of the instructions (software, firmware) described herein to be executed by a processor. In addition, embedded computing system 100 includes a safety component 118 that includes safety related functionality to enable compliance with automotive safety requirements. Such functionality may include support for CRC (cyclic redundancy check) of data, clock comparator for drift detection, error signaling, windowed watch-dog timer, and self-testing of the embedded computing system 100 for damage and failures.

Although FIG. 1 illustrates a specific implementation of embedded computing system 100, the disclosure is not limited to the specific implementation illustrated in FIG. 1. As an example, FIG. 1 may not illustrate all components found within an embedded computing system 100, and could include other components known by persons of ordinary in the art depending on the use case of the embedded computing system 100. For example, embedded computing system 100 could also include other programmable accelerator components not shown in FIG. 1 that are beneficial for certain use cases. Additionally or alternatively, even though FIG. 1 illustrates that one or more components within embedded computing system 100 are separate components, other implementations could combine components into a single component. The use and discussion of FIG. 1 is only an example to facilitate ease of description and explanation.

Figure 2:
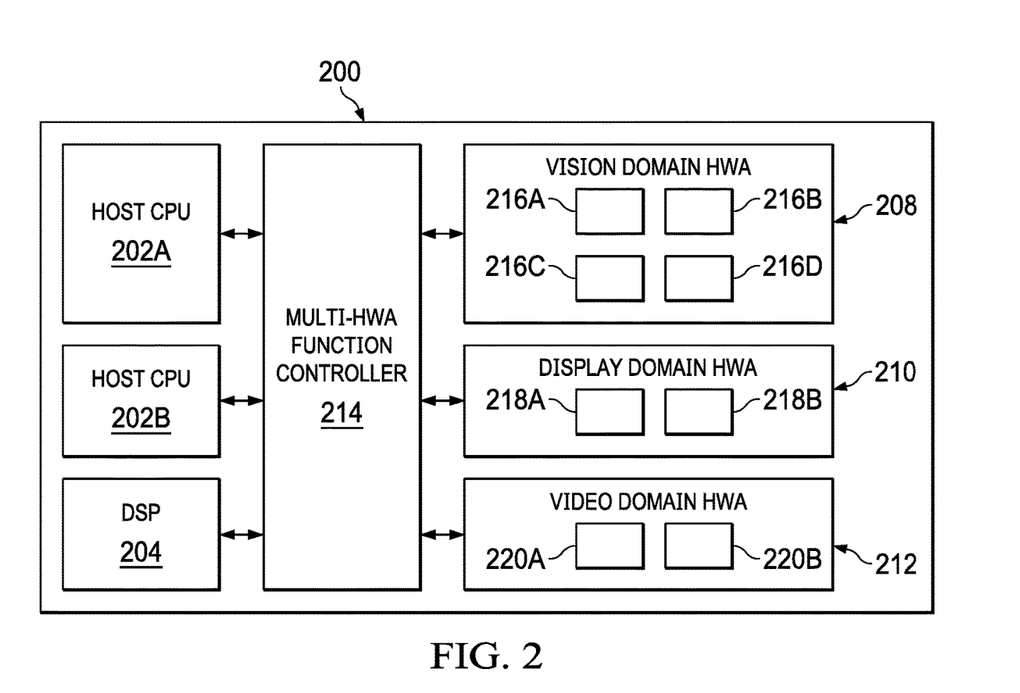
FIG. 2 is a high-level block diagram of an example embedded computing system that contains a multi-HWA function controller.

Multi-HWA Function Controller and Trusted and Sandboxed Communication Interfaces FIG. 2 is a high-level block diagram of an example embedded computing system 200 that contains a multi-HWA function controller 214. FIG. 2 illustrates that the multi-HWA function controller 214 interfaces with the one or more HWA thread users (also referred to as HWA thread user devices and include, for example, host CPU 202A, host CPU 202B, and DSP 204) and one or more domain specific HWAs (vision domain HWA 210, video domain HWA 212). In one or more implementations, the multi-HWA function controller 214 is a microcontroller unit (MCU) subsystem that supports communication between the HWA thread users 202A, 202B, 204 and the domain specific HWAs 208, 210, and 212. A MCU subsystem includes one or more MCU processors and embedded memory to control and manage the HWA threads amongst one or more domain specific HWAs. The MCU subsystem may be preferable to manage communication to multiple domain specific HWA because of scalability, design and development cost, and silicon area penalties. By way of example, the MCU subsystem provides flexibility by being able to assign any HWA thread within a domain specific HWA with any HWA thread user. The MCU subsystem is also scalable by updating MCU firmware with revised or new policy settings (e.g., when the number of virtual machines (VMs) that MCU subsystem needs to manage changes).

The HWA thread users represent underlying hardware resources that offload one or more tasks to one or more domain specific HWAs. In FIG. 2, host CPUs 202A and 202B and DSP 204 represent HWA thread users that send message requests to a vision domain HWA 208, a display domain HWA 210, and/or a video domain HWA 212. In an example, the vision domain HWA 208 is limited to executing vision domain tasks; the display domain HWA 210 is limited to executing display domain tasks; and the video domain HWA 212 is limited to executing vision domain tasks. In other words, the vision domain HWA 208, display domain HWA 210, and video domain HWA 212 are limited in processing flexibility when compared to a general-purpose processor, such as host CPU 202A and 202B, and/or other types of programmable accelerators, such as DSP 204. However, the vision domain HWA 208, display domain HWA 210, and video domain HWA 212 are more efficient at performing each of their respective domain tasks when compared to host CPUs 202A and 202B and DSP 204.

To improve operational efficiency (e.g., power efficiency and/or performance efficiency) a HWA thread user offloads domain tasks to respective domain specific HWAs by sending message requests. Each message request generally contains commands that represent domain tasks that are executable by a domain specific HWA. For example, a virtual machine (VM) runs a software application with host CPU 202A to generate a set of vision domain tasks. Although host CPU 202A has the capability to execute and process the vision domain tasks, host CPU 202A offloads the set of vision domain tasks to the vision domain HWA 208 for operational efficiency. By offloading domain tasks, the amount of time and/or power consumption for the vision domain HWA 208 to finish executing the set of vision domain tasks is relatively less than if host CPU 202A had processed the set of vision domain tasks.

The multi-HWA function controller 214 manages and controls message requests sent between the HWA thread users and the domain specific HWAs. In one or more implementations, to enhance safety and security, the embedded computing system 200 creates a trusted and sandboxed communication interface that securely transfers a message request from a HWA thread user to the multi-HWA function controller 214. A trusted and sandboxed communication interface acts as a security interface that separates and screens out data from non-designated HWA thread users. Stated another way, the trusted and sandboxed communication interface controls whether the underlying hardware resource (e.g., host CPU 202A, 202B or DSP 204) is a trusted source with permission to transfer a message request to multi-HWA function controller 214. As an example, if a trusted and sandboxed communication interface is setup to identify only host DSP 204 as the trusted source, then the trusted and sandboxed communication interface will not transfer message request received from host CPU 202A and/or 202B to multi-HWA function controller 214. Having separate trusted and sandboxed communication interfaces limits the effect of system failures and/or security intrusions. The trusted and sandboxed communication interface also provides privileged credential information for each message request to the multi-HWA function controller 214 to provide an additional layer of security to prevent malicious attacks, such as spoofing.

After receiving message requests, the multi-HWA function controller 214 schedules and assigns HWA threads to execute the message requests. The multi-HWA function controller 214 may schedule message requests destined for different domain specific HWAs. Using FIG. 2 as an example, host CPU 202A may generate a message request that contains a set of vision domain tasks, a second message request that includes a set of display domain tasks, and a third message request that has a set of video domain tasks. The multi-HWA function controller 214 receives the three different messages requests over one or more trusted and sandboxed communication interfaces, and subsequently assigns each message request to a HWA thread based on the type of domain task. In other words, the multi-HWA function controller 214 does not assign HWA threads that are incompatible with or unable to process domain tasks associated with other domains. For example, the multi-HWA function controller 214 assigns at least one of the vision HWA threads 216A-216D to execute the set of vision domain tasks, at least one of the display HWA threads 218A and 218B to execute the set of display domain tasks, and at least one of the video HWA threads 220A and 220B to execute the set of video domain tasks. The multi-HWA function controller 214 assigns a compatible HWA thread to execute the message request as the HWA thread becomes available. In situations where compatible HWA threads are busy, the multi-HWA function controller 214 may temporarily push the message requests into one or more different queues to wait for compatible HWA threads to become available.

In one or more implementations, as part of the scheduling operation, the multi-HWA function controller 214 performs intelligent scheduling operations to account for the capability of the destination, domain specific, HWA. In one or more implementations, the multi-HWA function controller 214 categorizes each domain specific HWA into classes depending on the capability of the HWA threads within the domain specific HWA. Using FIG. 2 as an example, after the multi-HWA function controller 214 schedules one of the vision HWA threads 216A-216D to process a message request, the multi-HWA function controller 214 determines whether the vision HWA threads 216A-216D fall into a class of HWA threads that includes a privilege generator for dynamically processing privileged credential information. If the vision HWA threads 216A-216D include a privilege generator, the multi-HWA function controller 214 may replay the privileged credential information inherited from the trusted and sandboxed communication interface to the assigned vision HWA threads 216A-216D. The multi-HWA function controller 214 also provides privileged configuration information to an 10 MMU (not shown in FIG. 2) to check the privileged credential information. If the assigned vision thread falls into a class that is unable to process privileged credential information, but may be assisted by the 10 MMU, data output from the vision domain HWA 208 is rerouted to the 10 MMU to confirm privileged credential information.

The multi-HWA function controller's 214 intelligent scheduling operations also support hardware virtualization and/or address space size conversions when determining HWA thread classes. In one or more implementations, the HWA thread user (e.g., host CPU 202A) may host one or more virtualized computing systems (e.g., VMs). Because of hardware virtualization, a message request sent from a HWA thread user may include commands to write to a specific virtualized destination address. To support hardware virtualization, the multi-HWA function controller 214 translates the virtualized destination address to a physical address. The multi-HWA function controller 214 may also perform address space size conversions when the domain specific HWA utilizes a different address space size. For example, the address information the multi-HWA function controller 214 receives may utilize a 64-bit address space. However, the domain specific HWA may utilize a 32-bit address space. As part of the intelligent scheduling operations, the multi-HWA function controller 214 converts the address information from a 64-bit address space to a lower bit address space (e.g., 32-bit address space).

MCU Subsystem and IPC Interfaces

Figure 3:
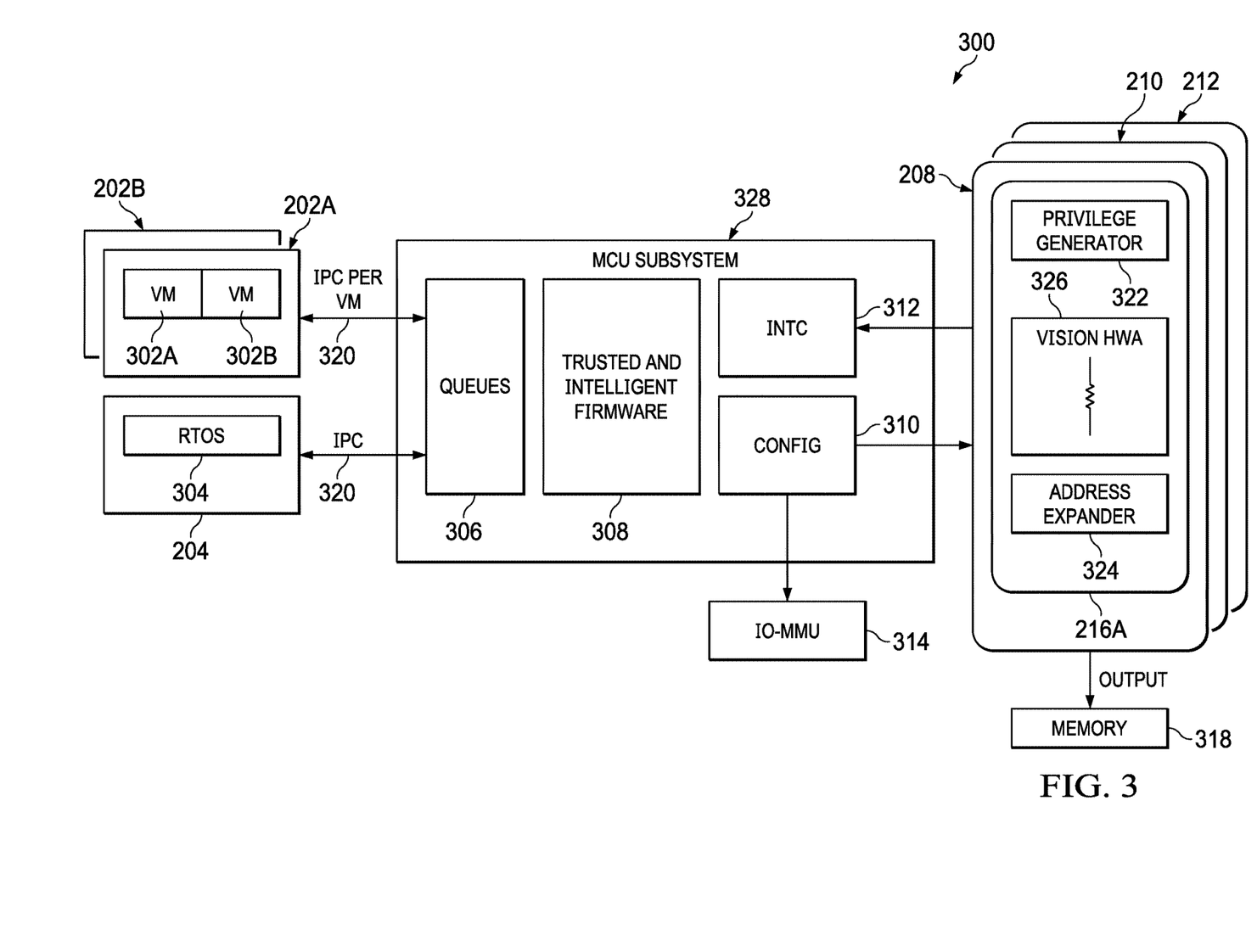
FIG. 3 is a block diagram of an example embedded computing system that contains a MCU subsystem as an example of a multi-HWA function controller and IPC interfaces as examples of trusted and sandboxed communication interfaces.

FIG. 3 is a block diagram of an example embedded computing system 300 that contains a MCU subsystem 328 as an example of a multi-HWA function controller and IPC interfaces 320 as examples of trusted and sandboxed communication interfaces. The IPC interfaces 320 are examples of communication interfaces. This example includes one IPC interface 320 for each device, for example one IPC interface 320 for host CPU 202A, one IPC interface 320 for host CPU 202B, and one IPC interface 320 for DSO 204. Each IPC interface 320 communicatively couples its respective device 202A, 202B, and 204 to the MCU subsystem 328. Each IPC interface 320 provides a processor-agnostic application program interface (API) for communicating with processing components. For example, IPC interface 320 may be used for communication between processors in a multi-processor environment (e.g., inter-core), communication to other hardware threads on the same processor (e.g., inter-process), and communication to peripherals (e.g., inter-device). Generally, as a software API, IPC interface 320 utilizes one or more processing resources, such as multiprocessor heaps, multiprocessor linked lists, and message queues, to facilitate communication between processing components.

In FIG. 3, the embedded computing system 300 creates an IPC interface 320 between the MCU subsystem 328 and each virtual computing system (e.g., a VM or virtual container) running on a HWA thread user. As an example, the embedded computing system 300 assigns one IPC interface 320 to communicate message requests between VM 302A and MCU subsystem 328 and another IPC interface 320 to communicate message requests between VM 302B and MCU subsystem 328. The embedded computing system 300 also creates an IPC interface 320 located between DSP 204 and MCU subsystem 328. VMs 302A and 302B each run a separate high-level OS (HLOS) within embedded computing system 300. For purpose of this disclosure, HLOS represents an embedded OS that is identical or similar to OS used in non-embedded environments, such as desktop computer and smart phones. With reference to FIG. 3 as an example, VMs 302A and 302B may run the same type of HLOS (e.g., both running an Android™ OS) or different types of HLOS (e.g., VM 302A runs a Linux™ OS, and VM 302B runs an Android™ OS).

Creating separate and isolated IPC interfaces 320 for DSP 204 and for each virtual computing system (e.g., VMs or virtual containers) running on host CPUs 202A and 202B enhances safety and security by separating out failures and/or security intrusions. For example, in FIG. 3, DSP 204 runs a real-time operating system (RTOS) 304 that provides features, such as threads, semaphores, and interrupts. In contrast to HLOS, RTOS may provide a relatively faster interrupt response at lower memory costs. In an advanced driver assistance system application, by utilizing a RTOS, the DSP 204 may manage automotive safety features (e.g., emergency braking) by processing real-time data from one or more sensors (e.g., camera). If other HWA thread users (e.g., host CPU 202A) suffer from a system failure or security intrusion, the automotive safety features that DSP 204 manages remain unaffected since the IPC interface 320 assigned to DSP 204 is isolated and separate from other IPC interfaces 320. The disclosure discusses IPC interfaces 320 in more detail later with reference to FIG. 5.

FIG. 3 illustrates that the MCU subsystem 328 includes an engine 308 that configures the MCU subsystem 328 to pair with the HWA threads within the vision domain HWA 208, display domain HWA 210, and video domain HWA 212. By pairing with different types of HWA threads, the engine 308 may control and manage different types of HWA threads and is not limited to communicating with specific types of HWA threads. Using FIG. 3 as an example, after the MCU subsystem 328 receives message requests via IPC interfaces 320, the engine 308 schedules and forwards message requests received from DSP 204 and/or from host CPUs 202A and 202B to one or more of the HWA threads within the vision domain HWA 208, display domain HWA 210, and/or video domain HWA 212. In one or more implementations, the engine 308 is firmware that supports policy settings, such as priority per thread and access control, to support scheduling and forwarding message requests to one or more HWA threads.

The engine 308 is able to support priority based queue service for each domain specific HWA (e.g., vision domain HWA 208). As shown in FIG. 3, the MCU subsystem 328 includes priority queues 306 that receive message requests from the IPC interfaces 320. Each priority queue 306 is set to receive message requests from one or more of the IPC interfaces 320. The priority queues 306 may be assigned different priorities depending on the type of HWA thread user that sends the message request. As an example, because of real-time constraints, the MCU subsystem 328 may assign a priority queue 306 that receives message requests from DSP 204 with a higher priority than priority queues 306 allocated for host CPU 202A and 202B. The engine 308 also may arrange the received message requests within each priority queue according to a priority operation. As an example, the priority operation may arrange the message requests within one of the priority queues 306 based on a first-in, first-out (FIFO) operation. Other examples could use other priority assignment operations to order message requests within a single priority queue 306. When the engine 308 extracts a message request from the priority queues 306 according to priority, the engine 308 assigns a HWA thread identifier to the message request. The HWA thread identifier indicates which HWA thread will execute the message request. In situations where the assigned HWA thread is busy, the engine 308 pushes the pending message request to a pending queue to wait until the assigned HWA thread is available to process the message request. If the assigned HWA thread is already available or idle, the engine 308 schedules the message request for execution.

The engine 308 may also perform intelligent scheduling operations to support multiple classes of HWA threads. As previously discussed, an embedded computing system 300 may include domain specific HWAs that have different processing capabilities. Since domain specific HWAs could have different capabilities, the engine 308 is configured to schedule message requests for different classes of HWA threads. To support multiple classes of HWA threads, MCU subsystem 328 includes a privilege configuration engine 310 that sends privileged configuration information to domain specific HWAs with privilege generators 322 and/or a support device, such as 10 MMU 314. The privileged configuration information includes policy information indicating the types of privilege levels for accessing certain sections of memory 318. Privilege generators 322 within HWA threads and/or 10 MMU 314 utilize the privileged configuration information to check privileged credential information associated with each message request.

The different classes of HWA threads include a class of HWA threads able to check privileged credential information. For example, IO-MMU 314 may be used to check privileged credential information. The first class of HWA thread identifies HWA threads that have a privilege generator 322 for dynamically processing privileged credential information (e.g., vision HWA thread 216A). If an assigned HWA thread includes a privilege generator 322, the engine 308 replays the privileged credential information inherited from IPC interface 320 to the assigned HWA thread. A second class of HWA thread encompasses HWA threads that do not have a privilege generator 322, but may be assisted by other hardware components to check privileged credential information. As an example, the 10 MMU 314 shown in FIG. 3 may assist and check the privileged credential information obtained from IPC interface 320. A third class of HWA thread represents HWA threads that do not have a privilege generator and are unable to utilize other hardware components to check privileged credential information. For the third class of HWA thread, the engine 308 may be unable to perform an additional security check with privileged credential information. In some implementations, the third class of HWA thread represents HWA threads that support hardware virtualization without checking privileged credential information.

FIG. 3 depicts that the vision HWA thread 216A within the vision domain HWA 208 also includes a privilege generator 322 and a vision HWA thread 326. The privilege generator 322 supports determining whether privileged credential information associated with a message request satisfies a privilege level to access and write data into a destination memory space. The privilege generator 322 evaluates privileged credential information, such as a VM identifier, a secure or non-secure mode identifier, a user or supervisor mode identifier, and/or HWA thread user identifier (e.g., host processor identifier), to determine whether the vision HWA thread 326 should access a destination memory space within memory 318. In one or more implementations, the privilege generator 322 contains an initiator security controller and a quality of service engine. The initiator security controller supports following and evaluating privileged credential information, for example, VM identifier and channelized firewalls, via MMR settings. The quality of service engine supports priority based policy via MMR settings when the vision HWA thread 326 executes the message requests. The vision HWA thread 326 represents a hardware thread that executes the message requests after verifying all message requests' privileged credential information. After executing a message request, the vision HWA thread 326 outputs data to memory 318.

The engine 308 may also classify HWA threads according to address space utilization. In one or more implementations, the engine 308 performs address space conversions when a domain specific HWA utilizes a different address space size than a hardware thread user employs (e.g., a 64-bit HLOS). As part of the intelligent scheduling operations, the engine 308 converts the address information from a larger address space to a smaller address space when sending message requests to certain HWA threads (e.g., vision HWA thread 216A). For example, the vision domain HWA 208 includes a vision HWA thread 216A that has an address expander 324 to support larger address spaces (e.g., 64-bit HLOS). In FIG. 3, the address expander 324 allows for the vision HWA thread 216A, which utilizes a smaller address space (e.g., 32-bit address space), to be compatible with a larger address spaces (e.g., 36-bit, 40-bit, and 48-bit address space). In one or more implementations, the address expander 324 performs region address translation (RAT) support address conversion from 32-bit to 36-bit, 40-bit, and/or 48-bit address space. RAT supports multiple high address spaces that may be mapped to a lower 32-bit address space via memory mapped register (MMR) settings.

After a HWA thread (e.g., vision HWA thread 216A) finishes executing a message request, the HWA thread sends an interrupt completion notification back to the MCU subsystem 328. The MCU subsystem 328 includes an interrupt controller (INTC) 312 to receive and process interrupt completion notifications from one or more HWA threads. For each interrupt completion notification INTC 312 receives, INTC 312 sends an acknowledgement message back the HWA thread user to indicate completing the execution of the message request. INTC 312 also informs the engine 308 that the HWA thread that sent the interrupt completion notification is now available to process a message request. An INTC 312 may be beneficial since one or more of the HWA threads are asynchronous hardware threads.

Figure 4:
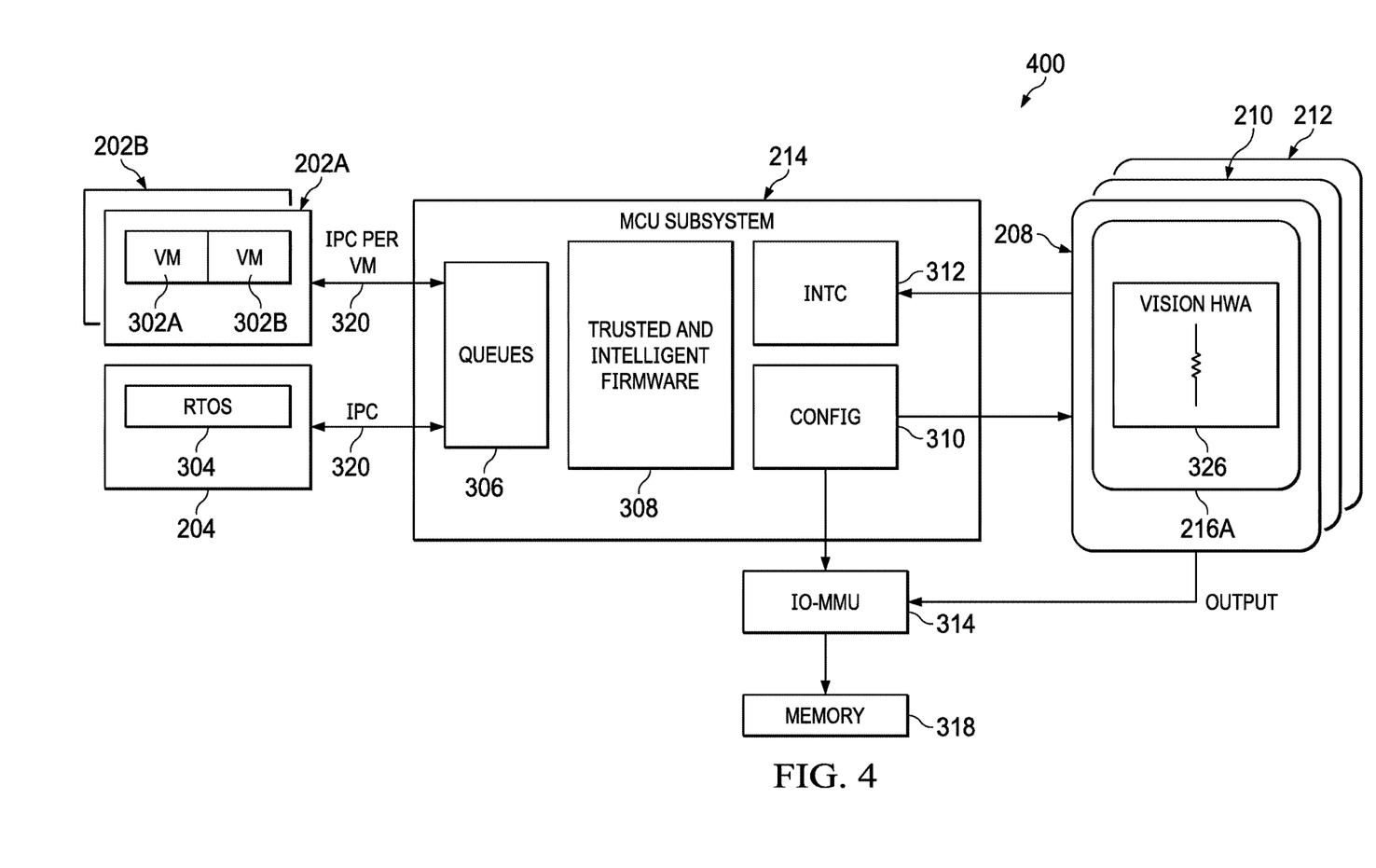
FIG. 4 is a block diagram of another example embedded computing system that contains a HWA thread without a privilege generator.

FIG. 4 is a block diagram of another example embedded computing system 400 that contains a HWA thread without a privilege generator. The embedded computing system 400 is similar to the embedded computing system 300 shown in FIG. 3 except that the vision HWA thread 216A does not include a privilege generator. As shown in FIG. 4, because the vision HWA thread 216A is unable to check privileged credential information for a message request, the MCU subsystem 328 provides instructions to the vision HWA thread 216A to reroute output data to the 10 MMU 314 for processing. When the 10 MMU 314 receives output data from vision HWA thread 216A, the 10 MMU 314 checks the privileged credential information against the privilege configuration information received from the privilege configuration engine 310. If the 10 MMU 314 determines that the message request is from a trusted source and has the necessary privilege credentials, 10 MMU 314 stores the output data to the destination memory address within memory 318.

Figure 5:
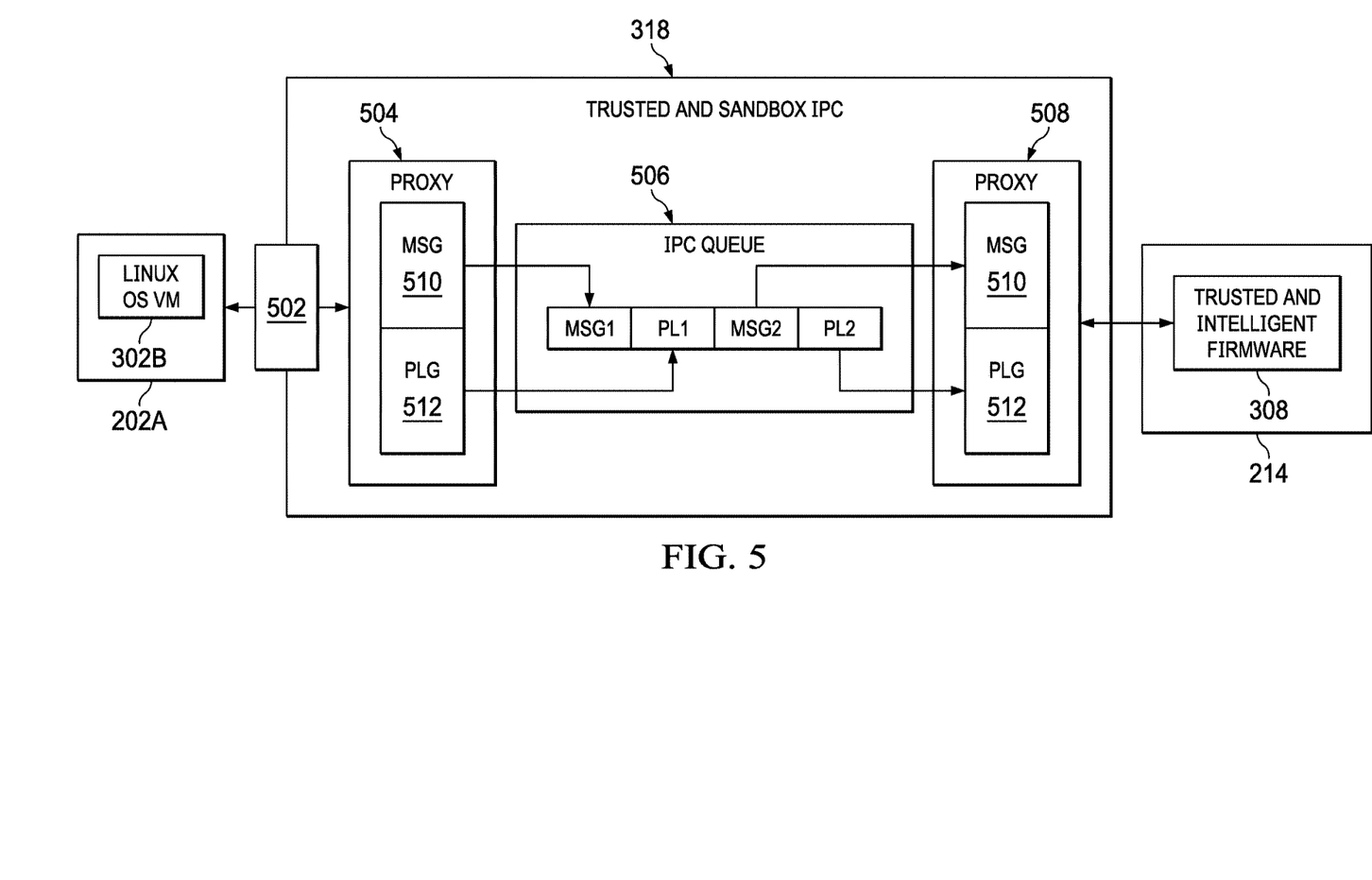
FIG. 5 is a block diagram of an example implementation of an IPC interface shown in FIGS. 3 and 4.

FIG. 5 is a block diagram of an example implementation of an IPC interface 320 shown in FIGS. 3 and 4. As previously discussed, an IPC interface 320 facilitates communication between the host CPU 202A and MCU subsystem 328. As shown in FIG. 5, host CPU 202A creates and runs VM 302A with a HLOS. When host CPU 202A sends a message request 510 to a domain specific HWA for VM 302A, a firewall 502 processes the message request 510. The firewall 502 has settings that allow hardware access to the IPC interface 320 based on a hardware resource identifier (e.g., CPU identifier). Stated another way, to isolate the IPC interface 320 from other IPC interfaces 320 that transfer message requests from other HWA thread users, firewall 502 prevents and filters out data from other HWA thread users (e.g., CPU 202B).

After a message request 510 passes firewall 502, the message request 510 encounters a first hardware proxy 504 that writes the message request 510 and privileged credential information 512 for message request 510 into an IPC queue 506. The message request 510 may include destination HWA thread information, one or more commands to be executed, and a destination memory address (e.g., input/output (IO) buffer address) to store output data from the destination, domain specific HWA. The privileged credential information 512 includes sub-attributes, such as an identifier for the virtual computing system (e.g., a VM or virtual container), an indication as to whether the message request is associated with a secure mode or non-secure mode and/or a user mode or supervisor mode, and the HWA thread user identifier (e.g., host CPU 202A or 202B identifier). Subsequently, a second hardware proxy 508 reads the message request 510 and privileged credential information 512 from the IPC queue 506 and passes both the message request 510 and privileged credential information 512 to the MCU subsystem 328. In one or more implementations, the IPC queue 506 represents a FIFO buffer, where the second hardware proxy 508 reads out the message request 510 based on the order the first hardware proxy 504 writes message request 510 into IPC queue 506. Other implementations could use other types of buffers to realize IPC queue 506.

Figure 6:
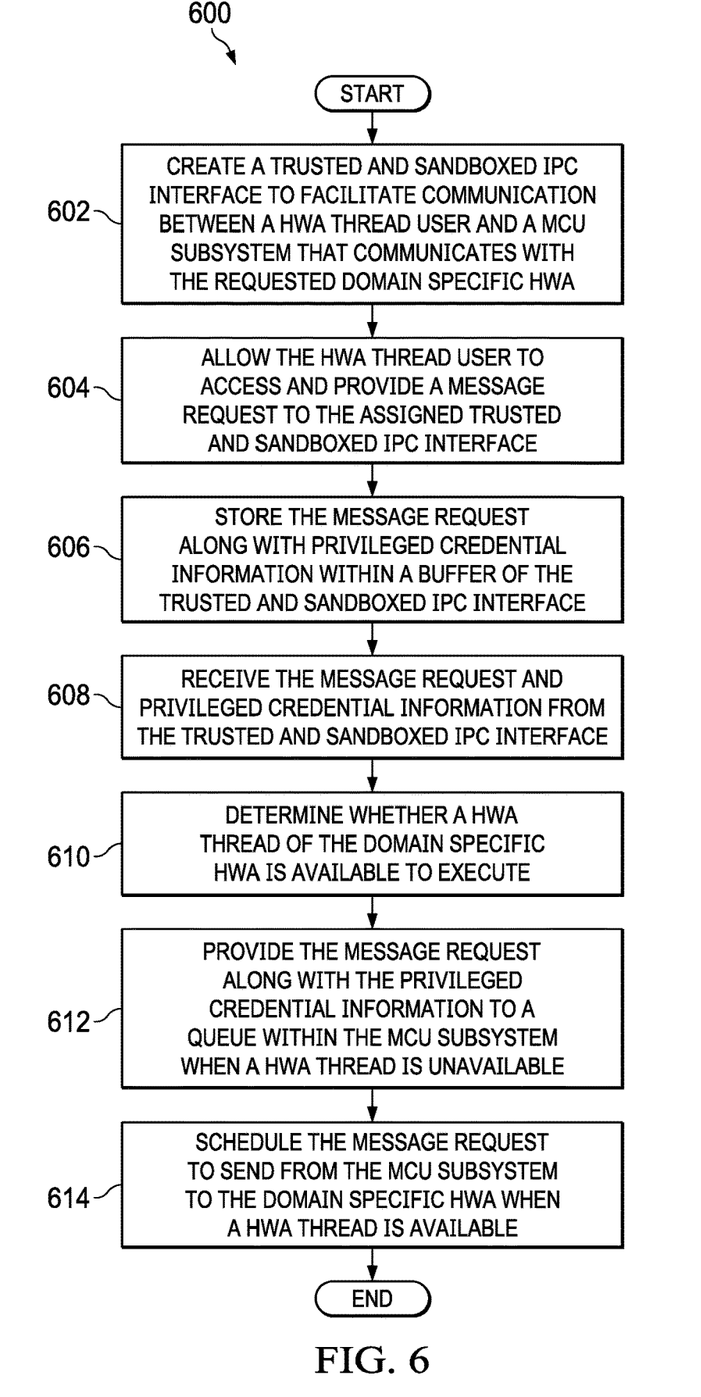
FIG. 6 is a flow chart of an implementation of a method to exchange communication between a HWA thread user and a multi-HWA function controller.

FIG. 6 is a flow chart of an implementation of a method 600 to exchange communication between a HWA thread user and a multi-HWA function controller. Method 600 may be implemented with a MCU subsystem 328 and IPC interface 320 as referenced in FIGS. 3-5. In particular, method 600 creates an IPC interface 320 for each virtual computing system hosted by a HWA thread user to facilitate communication between the HWA thread user and the MCU subsystem. Although FIG. 6 recites utilizing a MCU subsystem 328 and IPC interface 320, other implementations could use other types of multi-HWA function controllers and trusted and sandboxed communication interfaces. Additionally, even though FIG. 6 illustrates that the blocks of method 600 are implemented in a sequential operation, method 600 is not limited to this order of operation, and instead other implementations of method 600 may have one or more blocks implemented in parallel operations.

Method 600 starts at block 602 to create a trusted and sandboxed IPC interface to facilitate communication between a HWA thread user and a MCU subsystem that communicates with the requested domain specific HWA. In one or more implementations, method 600 creates a separate IPC interface for each virtual computing system operating on the HWA thread user. Creating separate and isolated IPC interfaces prevents system failures or security intrusions from affecting other HWA thread users. Method 600 then moves to block 604. At block 604, method 600 allows the HWA thread user to access and provide a message request to the created trusted and sandboxed IPC interface. As an example, method 600 could utilize a firewall to filter out message requests from other, non-designated, HWA thread users.

Method 600 may move to block 606 to store the message request along with privileged credential information within a buffer of the trusted and sandboxed IPC interface. Method 600 then continues to block 608 and receives the message request and privileged credential information from the trusted and sandboxed IPC interface. Method 600 moves to block 610 to determine whether a HWA thread of the domain specific HWA is available to execute. If a HWA thread is not available, then the message request is pushed to a pending queue to await an available HWA thread. Otherwise, at block 612, method 600 provides the message request along with the privileged credential information to a queue within the MCU subsystem when the assigned HWA thread is unavailable. Method 600 moves to block 614 and schedule the message request to send from the MCU subsystem to the domain specific HWA when a HWA thread is available.

Figure 7:
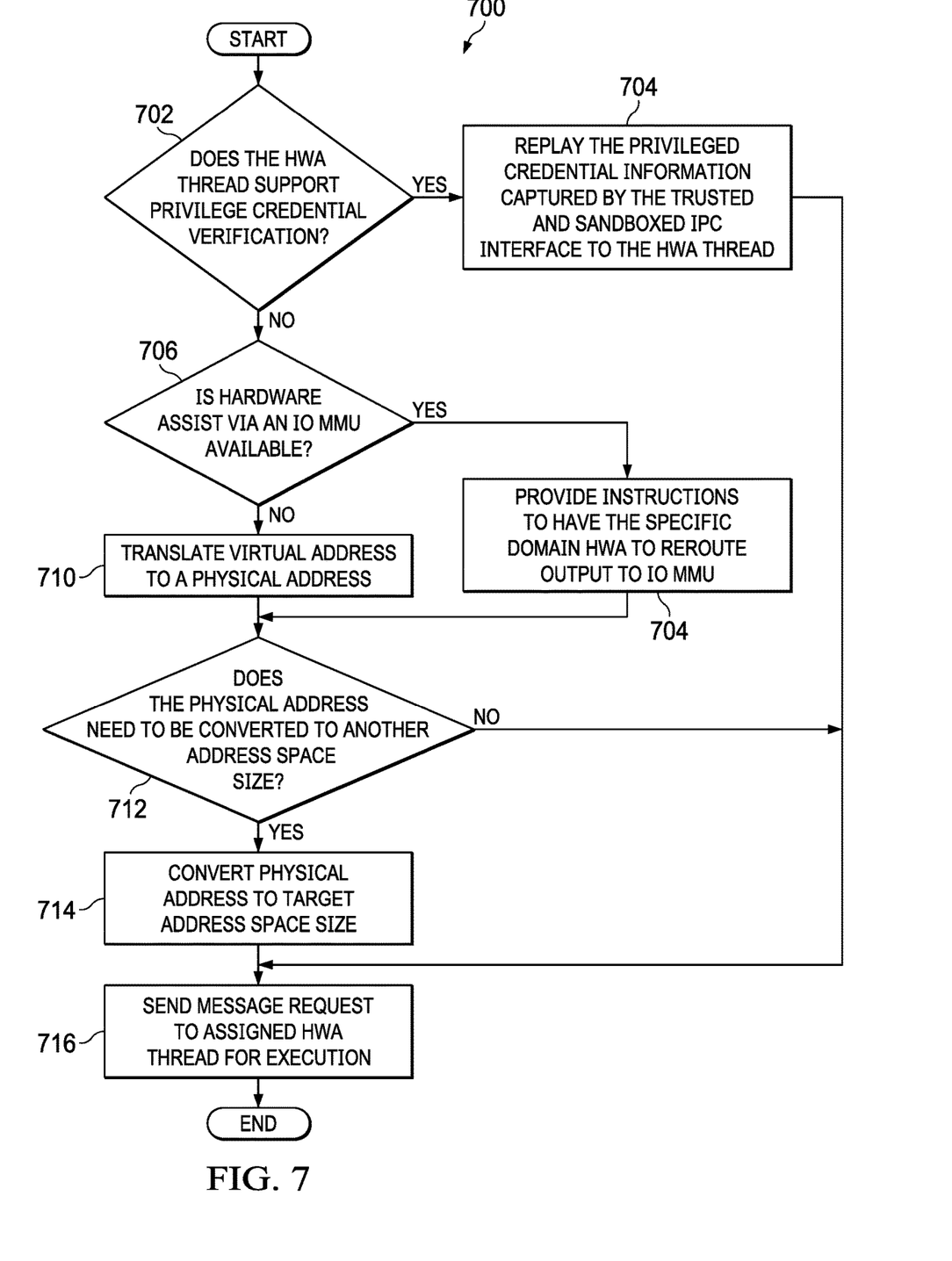
FIG. 7 is a flow chart of an implementation of a method that classifies message requests according to the capabilities of a destination, domain specific HWA.

FIG. 7 is a flow chart of an implementation of a method 700 that classifies message requests according to the capabilities of a destination, domain specific HWA. Method 700 may be implemented with a multi-HWA function controller 214 or a MCU subsystem 328 as referenced in FIGS. 2-5. Recall that as part of a multi-HWA function controller's scheduling operation, the multi-HWA function controller organizes message requests into classes according to the capability of the domain specific HWAs that will execute the message requests. By having method 700 sort message requests into classes, method 700 may schedule message requests for a variety of domain specific HWAs, where each domain specific HWA includes one or more HWA threads. Similar to FIG. 6, although FIG. 7 illustrates that the blocks of method 700 are implemented in a sequential operation, method 700 is not limited to this order of operations, and instead other implementations of method 700 may have one or more blocks implemented in parallel operations.

Method 700 starts at block 702 to determine whether a HWA thread assigned to execute a message request supports privileged credential verification. In one or more implementations, a HWA thread support privileged credential verification is performed by a privilege generator, previously discussed with reference to FIG. 3. If method 700 determines that the assigned HWA thread supports privileged credential verification, method 700 moves to block 704 to replay privileged credential information captured by the trusted and sandboxed IPC interface to the assigned HWA thread. Afterwards, method 700 moves to block 716 and sends the message request to the assigned HWA thread for execution.

Returning back to block 702, if method 700 determines that the assigned HWA thread does not support privileged credential verification, method 700 moves to block 706 and determines whether hardware assist via an 10 MMU is available. In one or more implementations, the multi-HWA function controller provides privileged configuration information to other hardware components besides domain specific HWAs (e.g., 10 MMU). Providing privileged configuration information allows the 10 MMU or other hardware components to check privileged credential information associated with a message request. If method 700 determines that hardware assist is available, then method 700 moves to block 708 and provides instructions to have the specific domain HWA reroute output to the hardware assist component (e.g., 10 MMU). Alternatively, if method 700 determines that no hardware assist is available, method 700 may move to block 710 to translate destination virtual address to a physical address. At block 710, method 700 does not verify or check privileged credential information for the message request.

After block 708 or 710, method 700 subsequently moves to block 712 and determines whether physical destination address needs to be converted to another address space size. As previously discussed, certain HWA threads may utilize an address expander to support address capability for one or more OS systems that utilize larger address space (e.g., 64-bit OS system). Because HWA threads use different address spaces than addresses HWA thread users employ, method 700 determines whether to convert to another address space size. Method 700 moves to block 714 if the physical address needs to be converted to a target address space size and replay privileged credential information captured by the trusted and sandboxed IPC interface to the assigned HWA thread. Afterwards, method 700 moves to block 716 and sends the message request to the assigned HWA thread for execution. Alternatively, if an address space conversion is not necessary, method 700 moves to block 716.

While several implementations have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

What is claimed is:

1. A method, comprising:
receiving, by a first communication interface of a controller, a first message request and privileged credential information from a first processor, wherein the controller is configured to provide message requests from the first processor to a hardware accelerator (HWA), and the first communication interface is between the first processor and the controller;
writing the first message request and privileged credential information into a queue of the first communication interface;
obtaining, by the controller, the first message request and the privileged credential information from the queue of the first communication interface;
receiving, by the controller, a second message request from a second processor, the second message request destined for the HWA; and
filtering out the second message request, by a firewall.

2. The method of claim 1, wherein the controller includes one or more microcontroller units (MCUs).

3. The method of claim 1, wherein the filtering out the second message request comprises determining that an identifier for the second processor does not match a first identifier for the first communication interface, the first identifier associated with the first processor.

4. The method of claim 1, wherein the first communication interface is implemented as an inter-processor communication (IPC) interface.

5. The method of claim 1, wherein the HWA executing tasks comprise of at least one of a vision domain, a video domain, or a display domain.

6. The method of claim 1, wherein writing the first message request comprises including destination HWA thread information, one or more commands to execute on the HWA, and a destination memory address in the first message request.

7. The method of claim 1, wherein a second communication interface is between the second processor and the controller.

8. The method of claim 7, wherein the first communication interface is for a first virtual machine running on the first processor and the second communication interface is for a second virtual machine running on the first processor.

9. A system comprising:
a processor;
a microcontroller unit (MCU) in communication with the processor; and
a hardware accelerator (HWA) in communication with the MCU, wherein the HWA is configured to run a HWA thread;
wherein the MCU is configured to:
- receive a message request and privileged credential information from the processor;
- assign the HWA thread to execute the message request;
- assign a class to the message request based on whether the HWA has verified the privileged credential information; and
- forward the privileged credential information to the HWA based on a determination that the message request belongs to a first class indicating the HWA is capable of processing privileged credential information using the HWA thread.

10. The system of claim 9, wherein the privileged credential information comprises virtual machine identifiers, an identifier of a secure or non-secure mode, an identifier of a user or supervisor mode, and a HWA thread user device identifier.

11. The system of claim 9, wherein the message request comprises destination HWA thread information, one or more commands to execute on the HWA, and a destination memory address.

12. The system of claim 11, wherein the processor is a general-purpose processor.

13. The system of claim 11, wherein the processor is a programmable accelerator.

14. The system of claim 9, wherein the message request and privileged credential information is obtained from an inter-processor communication (IPC) interface.

15. The system of claim 9, wherein the MCU is configured to assign the class to the message request by:
- assigning the message request into the first class based on a determination that the HWA is capable of processing privileged credential information;
- assigning the message request to a second class based on a determination that the HWA is unable to verify privileged credential information and another hardware component is configured to assist in verifying privileged credential information; and
- assigning the message request into a third class based on a lack of privileged credential information verification.

16. The system of claim 9, wherein the MCU is configured to perform address space conversion when the HWA thread performs an address expander operation.

17. A system comprising:
a first processor;
a second processor;
a microcontroller unit (MCU) in communication with the first processor and the second processor;
a first inter-processor communication (IPC) interface coupled between the first processor and the MCU;
a second IPC interface coupled between the second processor and the MCU, wherein the first IPC interface is isolated from the second IPC interface;
a first hardware accelerator (HWA) in communication with the MCU; and
a second HWA in communication with the MCU.

18. The system of claim 17, wherein the first IPC interface includes a first hardware proxy configured to write message requests received from the first processor to a queue and a second hardware proxy configured to read the message requests from the first processor.

19. The system of claim 17, wherein the first IPC interface includes a firewall that prevents the second processor from sending message requests to the first IPC interface.

20. A system comprising:
a microcontroller unit (MCU) configured to be in communication with processors and hardware accelerators (HWAs), wherein the HWAs comprises an HWA configured to run a HWA thread;
wherein the MCU is configured to:
- receive a message request and privileged credential information from a processor of the processors;
- assign a HWA thread of an HWA of the HWAs to execute the message request;
- assign a class to the message request based on whether the HWA is able to verify the privileged credential information; and
- forward the privileged credential information to the HWA based on a determination that the message request belongs into a first class indicating the HWA thread is capable of processing privileged credential information.

21. The system of claim 20, wherein the message request comprises destination HWA thread information, one or more commands to execute on the HWA, and a destination memory address.

22. The system of claim 20, wherein the message request and privileged credential information is obtained from an inter-processor communication interface.

23. The system of claim 20, wherein the MCU is configured to assign the class to the message request by:
- assigning the message request to the first class based on a determination that the HWA is capable of processing privileged credential information;
- assigning the message request into a second class based on a determination that the HWA is unable to verify privileged credential information and another hardware component is configured to assist in verifying privileged credential information; and
- assigning the message request into a third class based on a lack of privileged credential information verification.

24. The system of claim 20, wherein the MCU is configured to perform address space conversion when the HWA thread performs an address expander operation.

* * * * *